US009024579B2

(12) United States Patent
Igata

(10) Patent No.: US 9,024,579 B2
(45) Date of Patent: May 5, 2015

(54) POWER LINE COMMUNICATION APPARATUS AND VEHICLE

(75) Inventor: Yuji Igata, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 487 days.

(21) Appl. No.: 13/358,300

(22) Filed: Jan. 25, 2012

(65) Prior Publication Data
US 2012/0119701 A1 May 17, 2012

Related U.S. Application Data

(63) Continuation-in-part of application No. PCT/JP2010/004865, filed on Aug. 2, 2010.

(30) Foreign Application Priority Data

Jul. 31, 2009 (JP) .................................. 2009-178601

(51) Int. Cl.
H02J 7/00 (2006.01)
H02J 7/14 (2006.01)
(Continued)

(52) U.S. Cl.
CPC .............. *H04B 3/54* (2013.01); *B60L 11/1816* (2013.01); *B60L 11/1824* (2013.01); *H02J 7/02* (2013.01); *H02J 2007/0001* (2013.01); *Y02T 10/7005* (2013.01); *Y02T 90/16* (2013.01); *Y02T 90/121* (2013.01); *Y02T 90/14* (2013.01); *B60L 11/1846* (2013.01); *Y02T 90/163* (2013.01); *Y02T 90/169* (2013.01); *Y02T 90/128* (2013.01); *Y04S 30/14* (2013.01)

(58) Field of Classification Search
USPC .................................................. 320/104, 109
See application file for complete search history.

(56) References Cited

U.S. PATENT DOCUMENTS 5,717,310 A * 2/1998 Sakai et al. .................. 307/10.1
7,804,274 B2 * 9/2010 Baxter et al. .................. 320/109
(Continued)

FOREIGN PATENT DOCUMENTS

CN 101193769 6/2008
CN 101356705 1/2009
(Continued)

OTHER PUBLICATIONS

European Office Action dated Feb. 2, 2015, for corresponding EP Application No. 10 765 690.2-1806, 9 pages.

Primary Examiner — Richard Isla Rodas
Assistant Examiner — David V Henze-Gongola
(74) Attorney, Agent, or Firm — Seed IP Law Group PLLC

(57) ABSTRACT

A power line communication apparatus that enables communication to be performed between an authentication apparatus and a vehicle, thereby enabling authentication processing to be performed, even before power is supplied to a communication section from a charging apparatus or an electrical storage apparatus.

This power line communication apparatus has a communication section that communicates with a PC serving as an authentication apparatus outside the body of the vehicle via a power line, and a battery that is connected to the communication section and supplies power to the communication section; and the communication section performs authentication communication with the PC via the power line before power is supplied from the charging apparatus or the electrical storage apparatus.

11 Claims, 3 Drawing Sheets

(51) Int. Cl.
*H04B 3/54* (2006.01)
*B60L 11/18* (2006.01)
*H02J 7/02* (2006.01)

(56) References Cited

U.S. PATENT DOCUMENTS

| | | | |
|---|---|---|---|
| 2005/0285445 A1* | 12/2005 | Wruck et al. | 307/10.1 |
| 2007/0222413 A1* | 9/2007 | Kinoshita et al. | 320/104 |
| 2009/0043450 A1 | 2/2009 | Tonegawa | |

FOREIGN PATENT DOCUMENTS

| | | |
|---|---|---|
| CN | 101400542 | 4/2009 |
| EP | 1 995 109 | 11/2008 |
| EP | 1995109 A1 * | 11/2008 |
| EP | 2 058 916 | 5/2009 |
| JP | 2007-252016 | 9/2007 |
| KR | 10-2008-0032839 A | 4/2008 |
| WO | 2006/132070 | 12/2006 |

* cited by examiner

US 9,024,579 B2

POWER LINE COMMUNICATION APPARATUS AND VEHICLE

TECHNICAL FIELD

This invention relates to a power line communication apparatus and vehicle.

BACKGROUND

In recent years, electric vehicles in which an electrical storage apparatus and a drive apparatus as a motor are installed, and in which the motor is driven using charge power of the electrical storage apparatus, have attracted attention as environment-friendly vehicles. With a vehicle of this kind, power has been supplied by an external charging apparatus. That is to say, power has been supplied in the vehicle from a charging apparatus outside the vehicle body via a power line, and the supplied power has been stored in the electrical storage apparatus (see Related Art 1, for example).

CITATION LIST

Related Art

[PTL 1] Japanese Patent Application Laid-Open No. 2007-252016

SUMMARY OF INVENTION

Embodiments explained below are about a power line, communication apparatus and a Vehicle providing the apparatus. The power line communication apparatus is provided in a vehicle comprising an electrical storage apparatus that stores power supplied from a charging apparatus outside a vehicle body via a power line, and a wheel driving section that rotates a wheel by means of power stored in the electrical storage apparatus. The power line communication apparatus has an authentication processing section and an added power supply section which is different from the electrical storage apparatus. The authentication processing section performs authentication processing with an authentication apparatus outside the vehicle body via the power line before the charging apparatus supplies power to the electrical storage apparatus. And the power supply section supplies power to the authentication processing section during the authentication processing.

DESCRIPTION OF EMBODIMENT

Figure 1:
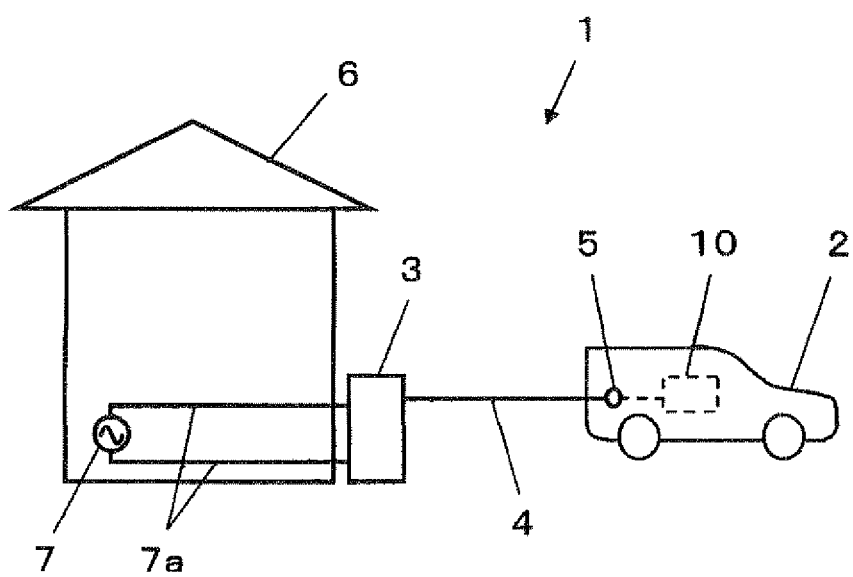
FIG. 1 is a drawing showing a configuration of a vehicle charging system according to an embodiment.

An embodiment of this invention will be now described with reference to the accompanying drawings. Identical or equivalent parts in the drawings are assigned the same reference codes in the following description.

A vehicle charging system according to this embodiment will now be described with reference to FIG. 1 through FIG. 3. A case will be described here by way of example in which a vehicle is an electric vehicle in which an electrical storage apparatus and a motor that rotates a wheel as a wheel driving section are installed, and the motor is driven using charge power of the electrical storage apparatus.

FIG. 1 is a schematic diagram showing a configuration of vehicle charging system 1 according to this embodiment. In FIG. 1, vehicle charging system 1 has charging apparatus 3, and vehicle 2 connected to charging apparatus 3 via power line 4.

When a vehicle owner leaves vehicle 2 for the purpose of a charging operation, the vehicle owner places vehicle 2 in a stopped state to prevent vehicle 2 from moving forward or otherwise starting to move by itself before removing the vehicle key—that is, stops the supply of power from electrical storage apparatus 10 to circuit sections and the motor driving section for safety. Then vehicle 2 and charging apparatus 3 are connected via power line 4 by the vehicle owner. By this means, power can be supplied from charging apparatus 3 to power supply inlet 5 of vehicle 2 via power line 4.

In vehicle 2, electrical storage apparatus 10 inside the vehicle body is charged with power supplied from power supply inlet 5. After the charging operation has been completed, in vehicle 2 a wheel is rotated by a motor using power stored in electrical storage apparatus 10, and vehicle 2 can move to another location.

Charging apparatus 3 is installed at a location adjacent to home 6, and a power plug is connected to an outlet attached to power line 7a of power supply 7 inside home 6. By this means, necessary power is supplied to charging apparatus 3 from power supply 7 of home 6.

By means of this configuration, power can be supplied from charging apparatus 3 to vehicle 2 via power line 4 in vehicle charging system 1. Also, since there is a possibility of theft of electricity if power can be supplied to any vehicle 2, such theft of electricity is prevented by performing authentication processing between an authentication apparatus and vehicle 2, and supplying power only to vehicle 2 for which authentication has been performed. Details of this electricity theft prevention will be given later herein.

Next, a detailed configuration of vehicle charging system 1 will be described. FIG. 2 is a block diagram showing a configuration of vehicle charging system 1 according to this embodiment.

Figure 2:
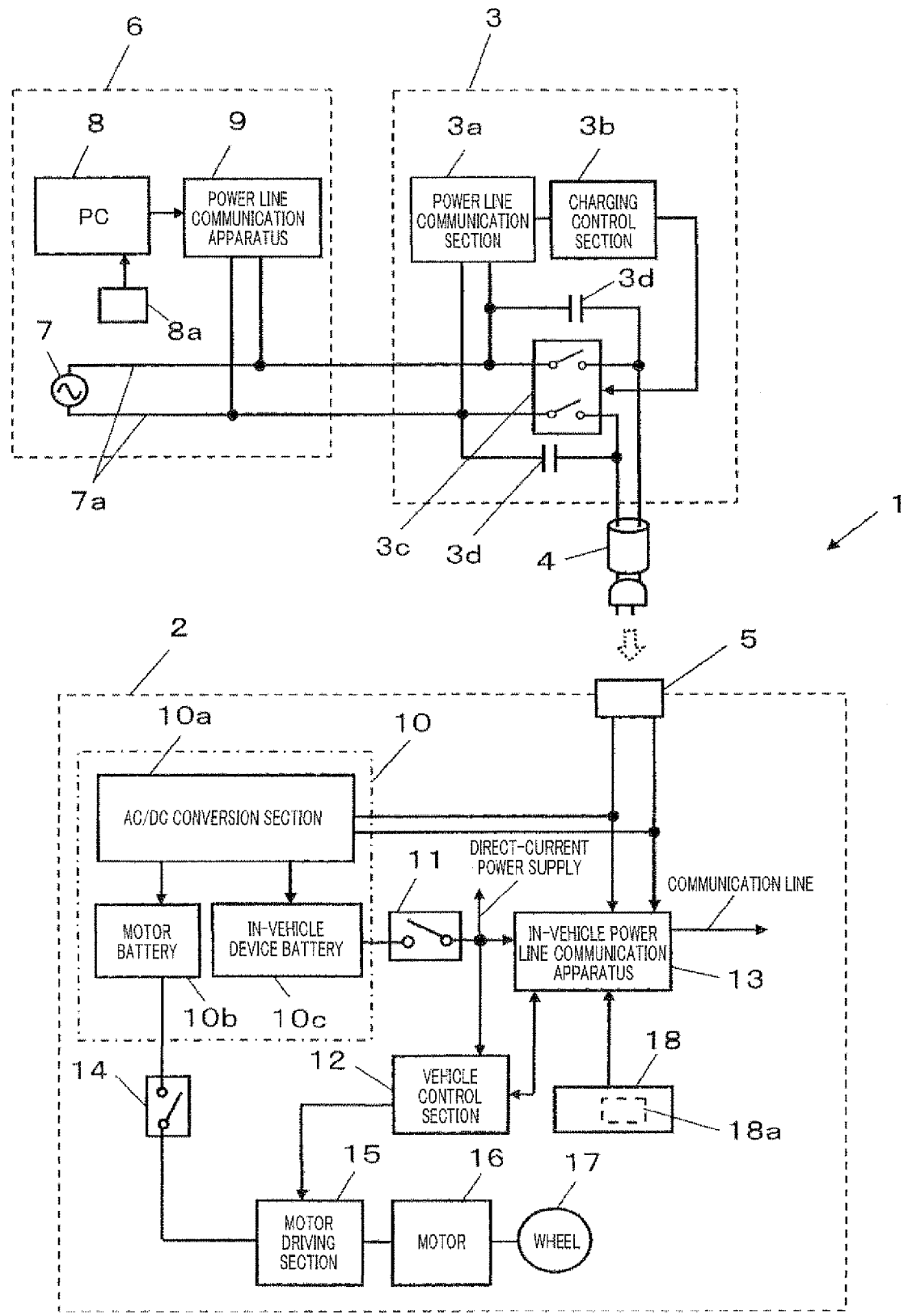
FIG. 2 is a block diagram showing a configuration of the above vehicle charging system.

As shown in FIG. 2, personal computer (hereinafter referred to as "PC") 8 serving as an authentication apparatus is connected to power line 7a of home 6 via power line communication apparatus 9. By using PC 8, a vehicle owner can set up an authentication environment easily and cheaply without having to purchase a dedicated authentication apparatus. C 8 performs charging apparatus 3 control based on a vehicle 2 authentication result. Unique registration information 18a is registered in vehicle 2 beforehand.

PC 8 communicates with power line communication apparatus 13 of vehicle 2 via power line communication apparatus 9, power line 7a, and power line 4, and acquires registration information 18a from power line communication apparatus 13. Then PC 8 compares previously read authentication information of IC card 8a with registration information 18a, and if the two match, determines that vehicle 2 is a registered vehicle. In this case, PC 8 controls charging apparatus 3, and supplies power from charging apparatus 3 to vehicle 2, which is a registered vehicle, via power line 4. In this way, theft of electricity by a malicious party is prevented.

Charging apparatus 3 has power line communication section 3a, charging control section 3b, and connecting section 3c.

Power line communication section 3a demodulates a control signal transmitted from PC 8 via power line communication apparatus 9 and power line 7a. Charging control section 3b places power line 7a and power line 4 in an electrically connected state or disconnected state by means of connecting section 3c, based on a control signal demodulated by power line communication section 3a. Specifically, connecting section 3c is configured as a switch. Connecting section 3c is controlled so as to be in a connecting state—that is, a closed state—or a disconnecting state—that is, an open state—by means of a control signal.

For example, if PC 8 determines vehicle 2 to be a registered vehicle according to an authentication result, PC 8 transmits a control signal placing connecting section 3c in a closed state to power line communication section 3a. By this means, charging control section 3b transmits a control signal setting a closed state—that is, a connecting state—to connecting section 3c. As a result, power is supplied to vehicle 2 from charging apparatus 3 via power line 4.

On the other hand, if vehicle 2 is determined to be an unregistered vehicle by PC 8, PC 8 transmits a control signal setting an open state to connecting section 3c via power line communication section 3a and charging control section 3b. By this means, connecting section 3c is placed in an open state—that is, a disconnecting state—and power is not supplied to vehicle 2 from charging apparatus 3.

When connecting section 3c is in an open state, power line 7a and power line 4 are not connected, and therefore communication channel is blocked at connecting section 3c.

Thus, in this embodiment, capacitors 3d allowing a high-frequency signal to pass are provided between the terminals of connecting section 3c. By this means, a high-frequency signal (for example, an authentication communication signal) can bypass connecting section 3c, thereby enabling PC 8 and vehicle 2 to communicate, even if connecting section 3c is in a disconnecting state—that is, even if power line 7a and power line 4 are not connected. That is to say, PC 8 can communicate with vehicle 2 via power line communication apparatus 9, power line 7a, capacitors 3d, and power line 4 even if connecting section 3c is in a disconnecting state.

Vehicle 2 has power supply inlet 5, electrical storage apparatus 10, switch 11, vehicle control section 12, power line communication apparatus 13, switch 14, motor driving section 15, motor 16, wheel 17, and registration information storage section 18.

In vehicle 2, power is supplied to electrical storage apparatus 10 from charging apparatus 3 via power line 4 connected to power supply inlet 5.

Electrical storage apparatus 10 has AC/DC conversion section 10a, motor battery 10b, and in-vehicle device battery 10c.

AC/DC conversion section 10a converts power from alternating-current to direct-current. An alternating current (at a voltage of 100 volts to 200 volts, for example) is converted to a direct current (at a voltage of approximately 50 volts to 300 volts for use by motor battery 10b or a voltage of 12 volts to 14 volts for use by in-vehicle device battery 10c, for example).

Motor battery 10b is connected to motor driving section 15 via switch 14. Motor battery 10b has a boost section (not shown) that boosts an internal voltage of approximately 300 volts with which motor battery 10b is charged to 600 volts to 700 volts, for example, and supplies 600-volt to 700-volt direct-current power from the boost section to motor driving section 15. Also, in-vehicle device battery 10c is connected to vehicle control section 12 and power line communication apparatus 13 via switch 11.

When vehicle 2 is placed in a started state by means of the vehicle key, for example, switch 11, which is a connecting section, is placed in a closed state—that is, a connecting state—and in-vehicle device battery 10c power is supplied to vehicle control section 12 and power line communication apparatus 13 via switch 11. On the other hand, when vehicle 2 is placed in a stopped state by means of the vehicle key, switch 11 is placed in an open state—that is, a disconnecting state—and in-vehicle device battery 10c power is not supplied to vehicle control section 12 and power line communication apparatus 13.

Similarly, when vehicle 2 is placed in a started state by means of the vehicle key, for example, switch 14 is placed in a closed state—that is, a connecting state—and motor battery 10b power is supplied to motor driving section 15 via switch 14.

On the other hand, when vehicle 2 is placed in a stopped state by means of the vehicle key, switch 14 is placed in an open state—that is, a disconnecting state—and motor battery 10b power is not supplied to motor driving section 15.

Motor driving section 15 rotates motor 16 using power supplied from motor battery 10b. Motor 16 is coupled to wheel 17, and rotates wheel 17.

Since vehicle 2 is thus placed in a stopped state by means of the vehicle key during a charging operation, switch 14 is placed in an open state, and power is not supplied to motor driving section 15. By this means, inadvertent movement of vehicle 2 due to rotation of motor 16 and rotation of wheel 17 during charging is prevented, thereby improving safety.

Also, when vehicle 2 is placed in a stopped state, power is not supplied to motor driving section 15 from motor battery 10b, and therefore power consumption is limited.

Similarly, when vehicle 2 is placed in a stopped state, switch 11 is placed in an open state and power is not supplied to vehicle control section 12, power line communication apparatus 13, and other in-vehicle devices, and therefore the power consumption in in-vehicle device battery 10c is limited.

Power line communication apparatus 13 is connected to registration information storage section 18, and can read registration information 18a registered and stored in registration information storage section 18 beforehand. Registration information 18a contains information for identifying vehicle 2 (such as a registration number of vehicle 2 for which charging is permitted, for example).

As described later herein, upon receiving an authentication processing signal from charging apparatus 3 via power line 4, power line communication apparatus 13 reads registration information 18a from registration information storage section 18, and returns read registration information 18a. Also, although not shown in the drawings, power line communication apparatus 13 is connected to other in-vehicle devices via a communication line inside the vehicle.

Now that the overall configuration of vehicle charging system 1 has been explained, power line communication apparatus 13, which is a characteristic part of this embodiment, will be described in detail.

Figure 3:
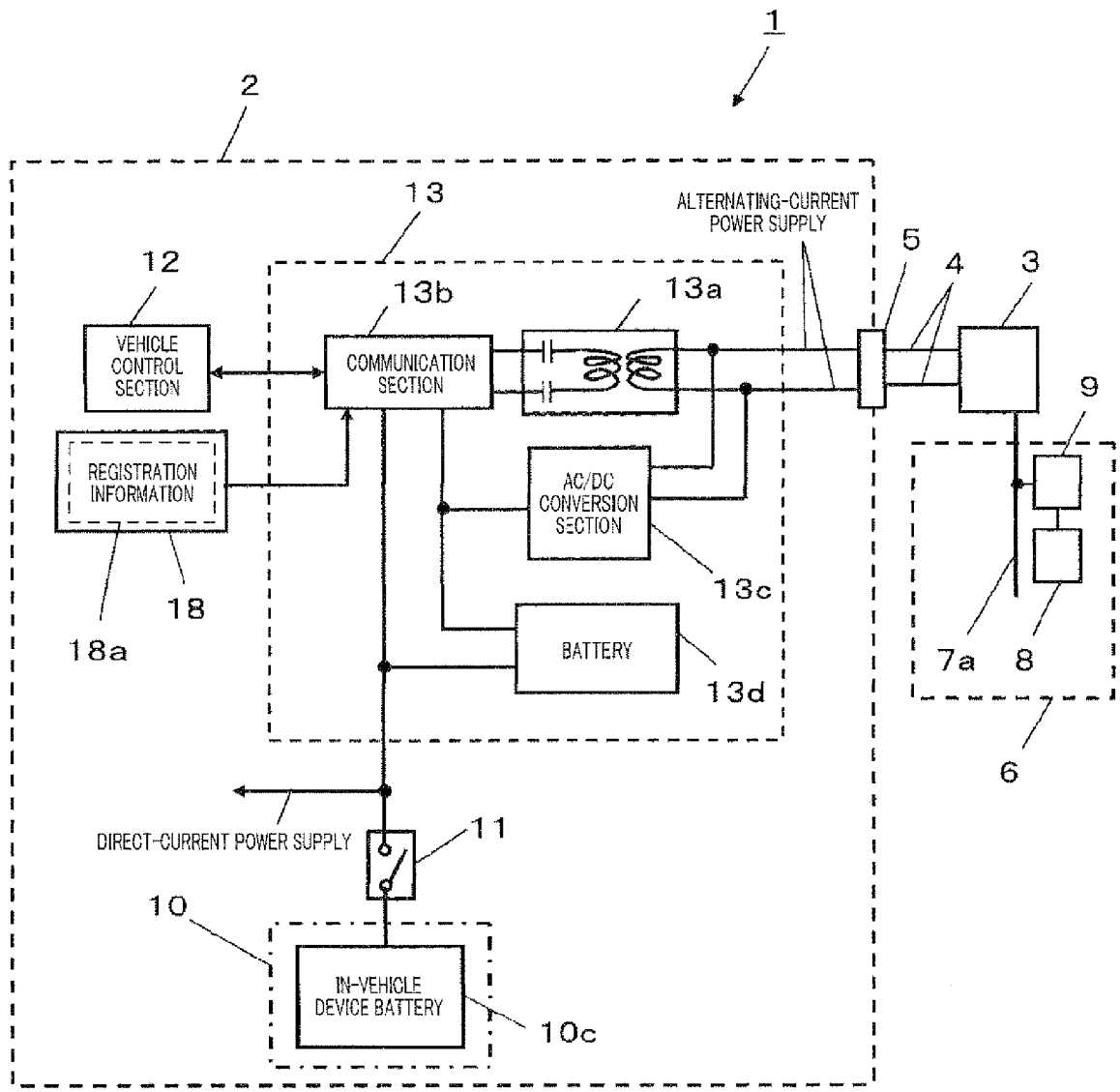
FIG. 3 is a block diagram showing a principal-part configuration of a vehicle of the above vehicle charging system.

FIG. 3 is a block diagram showing a principal-part configuration of vehicle 2 of vehicle charging system 1 according to this embodiment. As shown in FIG. 3, power line communication apparatus 13 has coupler 13a, communication section 13b, AC/DC conversion section 13c, which is a power conversion section, and battery 13d, which is a power supply section.

Coupler 13a is an element that fetches a communication signal from alternating-current power (at a voltage of 100 volts to 200 volts, for example) supplied via power line 4, or superimposes a communication signal.

Communication section 13b communicates with charging apparatus 3 via coupler 13a and power line 4. Communication section 13b has an authentication processing function. Registration information storage section 18 is connected to communication section 13b. Communication section 13b is configured so that, upon receiving an authentication processing signal via power line 4, communication section 13b reads registration information 18a for identifying vehicle 2 from registration information storage section 18, and returns read registration information 18a to charging apparatus 3. Registration information 18a is registered beforehand as authentication information in vehicle 2 that is to be registered using IC card 8a (FIG. 2).

By this means, for example, PC 8 inside home 6 can communicate with communication section 13b of vehicle 2 via power line 7a, charging apparatus 3, and power line 4. PC 8 can acquire registration information 18a via communication section 13b. Registration information 18a can perform authentication processing by comparing acquired registration information 18a with IC card 8a, and determining whether or not the two match. After this authentication processing is completed, power is supplied from charging apparatus 3 to vehicle 2 for which authentication has been performed. By this means, theft of electricity by a malicious party is prevented.

AC/DC conversion section 13c converts power supplied to power supply inlet 5 from alternating-current to direct-current, and supplies this to communication section 13b.

As described above, when vehicle 2 is placed in a stopped state by means of the vehicle key, switch 11 is placed in an open state and power is not supplied to communication section 13b from in-vehicle device battery 10e. In this case, communication section 13b circuitry does not operate, and therefore authentication processing cannot be performed and power cannot be supplied to electrical storage apparatus 10 from charging apparatus 3.

Thus, in this embodiment, battery 13d is provided in power line communication apparatus 13, and this battery 13d is connected to communication section 13b. By this means, communication section 13b is constantly supplied with power by battery 13d, and circuit sections are always operational. In this way, communication section 13b can perform authentication processing with PC 8 even if power is not supplied to communication section 13b from in-vehicle device battery 10e.

Battery 13d may be configured as a removable battery. According to this configuration, the battery can easily be replaced, and even when in-vehicle device battery 10c is not charged, circuitry can be operated by constantly supplying power to communication section 13b by means of battery 13d, and power can be supplied from charging apparatus 3 by completing authentication processing. Also, the vehicle 2 manufacturing process can be made more efficient since it is not necessary to charge in-vehicle device battery 10e beforehand. Furthermore, if there is no power stored in in-vehicle device battery 10c, there is no possibility of sparking or a flow of a large current due to output terminal shorting, and operational safety can be improved.

Also, although battery 13d is used above, this is by no means limiting. For example, a chargeable electrical storage section such as a capacitor may be used instead of a battery. By means of this configuration, when in-vehicle device battery 10c and battery 13d are connected by switch 11, battery 13d is charged with in-vehicle device battery 10c power. By this means, even if battery 13d capacity is insufficient, power can be supplemented while vehicle 2 is in a started state, and battery replacement is unnecessary, improving serviceability.

Furthermore, a configuration has been assumed in which battery 13d and AC/DC conversion section 13c are connected, and charging is performed with power from AC/DC conversion section 13c. By means of this configuration, when power is supplied from charging apparatus 3 via power line 4, battery 13d is charged with AC/DC conversion section 13c power, and therefore even if battery 13d capacity is insufficient, power can be supplemented while electrical storage apparatus 10 of vehicle 2 is being charged. As a result, battery replacement is unnecessary, improving serviceability.

In power line communication apparatus 13, a switch (not shown) may be provided in the power line connecting communication section 13b and battery 13d. In this case, the switch is made to interlock with the operation of switch 11. For example, the switch is controlled so as to be placed in a closed state when switch 11 is in an open state (when vehicle 2 is in a stopped state), and power is supplied from battery 13d to communication section 13b only when electrical storage apparatus 10 of vehicle 2 is charged. By this means, supply of power from battery 13d to communication section 13b can be kept to the minimum necessary, and a reduction in the power with which battery 13d is charged can be limited, resulting in greater durability.

As described above, according to this embodiment, as shown in FIG. 3, power line communication apparatus 13 is provided in vehicle 2 having electrical storage apparatus 10 that stores power supplied from charging apparatus 3 outside the body of vehicle 2 via power line 4, and motor 16 which is a wheel driving section that rotates wheel 17 by means of power stored in electrical storage apparatus 10; and has a configuration having communication section 13b that communicates with PC 8 serving as an authentication apparatus outside the body of vehicle 2 via power line 4, and battery 13d that is connected to communication section 13b and constantly supplies power to communication section 13b, wherein communication section 13b can perform authentication communication with PC 8 via power line 4 before power is supplied from charging apparatus 3 or electrical storage apparatus 10.

By means of this configuration, even before communication section 13b is supplied with power from electrical storage apparatus 10 while vehicle 2 is in a stopped state, or when power is not supplied to electrical storage apparatus 10 from charging apparatus 3 prior to authentication processing, power is supplied to communication section 13b from battery 13d and circuitry operates, and therefore power line communication apparatus 13 can perform authentication communication with PC 8 via power line 7a and power line 4. By this means, PC 8 can perform authentication communication with power line communication apparatus 13 via power line 7a, charging apparatus 3, and power line 4, even before power is supplied from electrical storage apparatus 10 or charging apparatus 3. PC 8 can acquire registration information 18a from power line communication apparatus 13 and compare this with authentication information of IC card 8a read beforehand, and supply power to vehicle 2 from charging apparatus 3 only if the authentication information and registration information 18a match. Consequently, theft of power by a malicious party can be prevented.

Vehicle 2 has power line communication apparatus 13, electrical storage apparatus 10 that stores power supplied from charging apparatus 3 outside the body of vehicle 2, and motor 16 that rotates wheel 17 by means of power stored in electrical storage apparatus 10.

By means of this configuration, even if power is not supplied to power line communication apparatus 13 from charging apparatus 3 or electrical storage apparatus 10, power line communication apparatus 13 circuitry is always operational by means of internal battery 13d, enabling authentication communication to be performed between vehicle 2 and charging apparatus 3. By this means, PC 8 can supply power from charging apparatus 3 only to vehicle 2 for which authentication has been performed, and theft of electricity by a malicious party can be prevented.

An actual configuration of this invention is not limited to the above-described embodiment, and various variations and modifications may be possible without departing from the scope of this invention.

For example, referring to FIG. 3, battery 13d installed in power line communication apparatus 13 only has to supply power to charging control section 3b, and may therefore have a small electrical storage capacity. Consequently, a capacitor of small capacity may be used. In this case, it has been assumed that switch 11 is maintained in an open state when vehicle 2 is placed in a stopped state, but this is by no means limiting. For example, a switch that operates on an intermittent basis may be additionally provided between in-vehicle device battery 10c and battery 13d and charge the battery 13d capacitor intermittently. By this means, in-vehicle device battery 10c output can be supplied to battery 13d while limiting the output discharged from in-vehicle device battery 10c.

Also, when vehicle 2 is placed in a stopped state, switch 11 may be placed in an open state at a later timing than switch 14. By this means, the duration of charging from in-vehicle device battery 10c to battery 13d can be increased, thereby enabling power stored in battery 13d to be maintained.

Registration information of IC card 8a has been used as authentication information, but this is by no means limiting. For example, provision may be made for a network ID or encryption key of power line communication apparatus 9 to be used instead of using IC card 8a registration information. This would make IC card 8a unnecessary, and enable the cost of setting up an authentication environment to be kept down.

An electric vehicle has been described as an example, but this is by no means limiting, and can also be applied, for example, to a hybrid vehicle that uses both a motor and an engine. Also, a case in which direct-current power is supplied to power supply inlet 5 can be envisaged, in which case AC/DC conversion section 13c inside power line communication apparatus 13 would be replaced by a DC/DC conversion section. A DC/DC conversion section performs voltage conversion of direct-current power supplied from the power supply inlet and supplies direct-current power that operates communication section 13b to communication section 13b.

It is also possible for direct-current power supplied to power supply inlet 5 to be used directly as direct-current power that operates communication section 13b. In this case, the above-described DC/DC conversion section is unnecessary.

The disclosure of Japanese Patent Application No. 2009-178601, filed on Jul. 31, 2009, including the specification, drawings and abstract, is incorporated herein by reference in its entirety.

Industrial Applicability

An above-described power line communication apparatus is provided in a vehicle having an electrical storage apparatus that stores power supplied from a charging apparatus outside the vehicle body via a power line, and a wheel driving section that rotates a wheel by means of power stored in the electrical storage apparatus; and has a configuration having a communication section that communicates with an authentication apparatus outside the vehicle body via the power line, and a power supply section that is connected to the communication section and supplies power to the communication section, wherein the communication section can perform authentication communication with the authentication section via the power line before power is supplied from the charging apparatus or the electrical storage apparatus, so that, even if power is not supplied from the charging apparatus or the electrical storage apparatus, power is supplied to the communication section from the power supply section and the circuitry can be operated, and authentication communication can be performed with the authentication apparatus outside the vehicle body via the power line at any time.

Consequently, power can be supplied to the electrical storage apparatus from the charging apparatus via the power line only for a vehicle for which authentication has been performed by the authentication apparatus, enabling theft of electricity by a malicious party to be prevented.

Thus, this invention is useful for a power line communication apparatus installed in a vehicle such as an electric vehicle or hybrid vehicle that stores power in an electrical storage apparatus via a power line from a charging apparatus outside the vehicle body, and runs by rotating a wheel by means of a wheel driving section utilizing this stored power, and a vehicle using such a power line communication apparatus.

Reference Signs List
1 Vehicle charging system
2 Vehicle
3 Charging apparatus
3a Power line communication section
3b Charging control section
3c Connecting section
3d Capacitor
4, 7a Power lines
5 Power supply inlet
6 Home
7 Power supply
8 PC (authentication apparatus)
8a IC card
9 Power line communication apparatus
10 Electrical storage apparatus
10a, 13c AC/DC conversion sections (power conversion sections)
10b Motor battery
10c In-vehicle device battery
11, 14 switches (connecting sections)
12 Vehicle control section
13 Power line communication apparatus
13a Coupler
13b Communication section
13d Battery (power supply section)
15 Motor driving section
16 Motor (wheel driving section)
17 Wheel
18 Registration information storage section
18a Registration information

The invention claimed is:

1. A power line communication apparatus that is provided in a vehicle, the vehicle comprising a motor battery and an accessory battery that store power supplied from a charging apparatus outside a vehicle body via a power line, the power line communication apparatus comprising:
an authentication processing section that performs authentication processing with an authentication apparatus outside the vehicle body via the power line before the charging apparatus supplies power to the motor battery and the accessory battery; and a power supply section, auxiliary to the motor battery and the accessory battery, that is configured to supply power to the authentication processing section during the authentication processing.

2. The power line communication apparatus according to claim 1, wherein the power supply section is configured as an electrical storage section that is charged with power from the motor battery and the accessory battery.

3. The power line communication apparatus according to claim 2, further comprising a first connecting section that controls electrical connection and disconnection between the electrical storage section and the motor battery and the accessory battery.

4. The power line communication apparatus according to claim 3, wherein, when a wheel driving section stops the wheel, the first connecting section electrically disconnects the electrical storage section from the motor battery and the accessory battery.

5. The power line communication apparatus according to claim 4, wherein, when the wheel driving section rotates the wheel, the first connecting section electrically connects the electrical storage section and the motor battery and the accessory battery and the electrical storage section stores power output from the motor battery and the accessory battery.

6. The power line communication apparatus that is provided in the vehicle according to claim 4, the vehicle further comprising a second connecting section that controls electrical connection and disconnection between the motor battery and the accessory battery and the wheel driving section, wherein, when the wheel driving section stops the wheel, after the second connecting section electrically disconnects the motor battery and the accessory battery from the wheel driving section, the first connecting section electrically disconnects the electrical storage section from the motor battery and the accessory battery.

7. The power line communication apparatus according to claim 4, further comprising a third connecting section that controls electrical connection and disconnection between the authentication processing section and the electrical storage section, wherein, when the wheel driving section stops the wheel, the third connecting section electrically connects the authentication processing section and the electrical storage section.

8. The power line communication apparatus according to claim 1, wherein the authentication processing section is connected to a registration information storage section that stores registration information for identifying a vehicle, and returns the registration information upon receiving an authentication processing signal via the power line.

9. The power line communication apparatus according to claim 1, wherein the power supply section is configured as a removable battery.

10. The power line communication apparatus according to claim 1, further comprising a power conversion section that is connected to the power line and converts an alternating-current power supply to a direct-current power supply, wherein:

the power supply section is an electrical storage section that is capable of storing power; and the electrical storage section stores power converted by the power conversion section.

11. A power line communication apparatus that is provided in a vehicle, the vehicle comprising a motor battery and an accessory battery that store alternating-current power supplied from a charging apparatus outside a vehicle body via a power line, the power line communication apparatus comprising:

an authentication processing section that performs authentication processing with an authentication apparatus outside the vehicle body via the power line before the charging apparatus supplies alternating-current power to the motor battery and the accessory battery;

a superimposition section that superimposes information to be transmitted from the authentication processing section to the charging apparatus on the power line in the authentication processing;

a power supply section, auxiliary to the motor battery and the accessory battery, that is configured to supply power to the authentication processing section during the authentication processing; and a power conversion section, auxiliary to the motor battery and the accessory battery, that is configured to convert the alternating-current power to direct-current power after completion of the authentication processing, and supplies that direct-current power to the authentication processing section.

* * * * *